(12) United States Patent
Bacher et al.

(10) Patent No.: US 7,516,360 B2
(45) Date of Patent: Apr. 7, 2009

(54) SYSTEM AND METHOD FOR EXECUTION OF A JOB IN A DISTRIBUTED COMPUTING ARCHITECTURE

(75) Inventors: Utz Bacher, Tuebingen (DE); Oliver Benke, Leinfelden-Echterdingen (DE); Boas Betzler, Magstadt (DE); Thomas Lumpp, Reutlingen (DE); Eberhard Pasch, Tuebingen (DE)

(73) Assignee: International Business Machines Corporation, Armonk, NY (US)

( * ) Notice: Subject to any disclaimer, the term of this patent is extended or adjusted under 35 U.S.C. 154(b) by 624 days.

(21) Appl. No.: 10/937,682

(22) Filed: Sep. 9, 2004

(65) Prior Publication Data

US 2005/0081097 A1    Apr. 14, 2005

(30) Foreign Application Priority Data

Sep. 12, 2003    (EP)    ................................ 03103377

(51) Int. Cl.
G06F 11/00    (2006.01)
G06F 11/20    (2006.01)

(52) U.S. Cl. .................. 714/12; 714/15; 714/43
(58) Field of Classification Search ............ 714/12, 714/13, 15, 43
See application file for complete search history.

(56) References Cited

U.S. PATENT DOCUMENTS 5,235,700 A * 8/1993 Alaiwan et al. ............... 714/13
5,875,290 A * 2/1999 Bartfai et al. ................ 714/13
6,195,760 B1 * 2/2001 Chung et al. .................. 714/4
6,219,801 B1 * 4/2001 Yuge et al. ................... 714/13
6,438,707 B1 * 8/2002 Ronstrom .................... 714/13
6,823,474 B2 * 11/2004 Kampe et al. ................ 714/13

OTHER PUBLICATIONS

ET Phone SETI@home! by Tony Phillips Published y Science@NASA, May 23, 1999 http://science.nasa.gov/newhome/headlines/ast23may99$_{13}$ 1.htm.*
Wikipedia's Grid Computing retrieved Jul. 18, 2007.*
Chapter 5: Topology version from Feb. 26, 2001 found via the WayBack Machine http://web.archive.org/web/20010226173012/http://fcit.usf.edu/network/chap5/chap5.htm.*

* cited by examiner

*Primary Examiner*—Scott T. Baderman
*Assistant Examiner*—Joseph Schell
(74) *Attorney, Agent, or Firm*—Geraldine D. Monteleone, Esq.; Lawrence D. Cutter, Esq.; Heslin Rothenberg Farley & Mesiti P.C.

(57) ABSTRACT

The present invention provides a system and method for the execution of jobs in a distributed computing architecture that uses worker clients which are characterized by a checkpointing mechanism component for generating checkpointing information being assigned to at least one worker client, at least one failover system being assigned to the worker client, a component (failover system selection component) for automatically assigning at least one existing or newly created failover system to the failure system being assigned to a worker client in the case said worker clients fails, wherein the assigned failover system provides all function components in order to take over the execution of the job when said assigned worker client fails, wherein the assigned failover system further includes at least a failover monitor component for detecting failover situations of said assigned worker client.

17 Claims, 13 Drawing Sheets

Worker client and failover system

SYSTEM AND METHOD FOR EXECUTION OF A JOB IN A DISTRIBUTED COMPUTING ARCHITECTURE

FIELD OF THE INVENTION

The present invention Relates to a system and method for execution of a job in a distributed computing architecture (e.g. grid architecture), and more particular to assure the completion of the execution of a job assigned to a specific worker client in a distributed computing architecture in the case of failure. The term "distributed computing architecture" as used in the present patent application means any large collaboration of data processing systems (worker clients) in which individual data processing system owners allow some of their computer's processing time to be put at the service of a large problem.

The distributed computing architecture comprises at least a distributed management server and n—worker clients. The distributed management gets requests to perform a task, divides the task into smaller work units (jobs), selects worker clients for each job, sends said jobs to said selected worker clients, receives the results from the single worker client, and returns a consolidated result to the requester.

The term "Grid architecture" as used in the patent application is a specific distributed computing architecture that allows registering of third party systems as worker clients.

BACKGROUND OF THE INVENTION

In more detail, a distributed computing architecture (see FIG. 1) consist of software agents installed on a number of worker clients (5), and one or more dedicated distributed computing management servers (2). There may also be requesting worker clients with software that allows them to submit jobs along with lists of their required resources.

An agent running on a processing worker client detects when the system is idle, notifies the management server (2) that the system is available for processing, and requests an application package from the server and runs the software when it has spare CPU cycles, and sends the results back to the server.

The distributed computing management servers (2) have several roles. They take distributed computing requests (1), divide their large processing tasks into smaller units of works (jobs; 17) that can run on individual systems, send application packages and some client management software to the idle worker client that request them (15; 16), monitor the status or the job being run by the worker client, and assembles the results sent back by the client (18).

If the management server does not hear from a processing worker client for a certain period of time, because the user has disconnected his system or he is using the system heavily for long periods, it may send the same application to another idle system. Alternatively, it may have sent out the package to several systems at once, assuming that one more set of results will be returned. The server is also managing any security, policy, or other management functions as necessary.

The complexity of a distributed computing architecture increases with its size and type of environment. A larger environment that includes multiple departments, partners, or participants across the Web requires complex resource identification, policy management, authentication, encryption etc.

Obviously, the applications itself must be suitable for distributed computing.

Prior Art

In distributed computing environment with many worker clients there is the problem to assure the completion of the job assigned to a specific worker client if the worker client fails, e.g. due to a loss of networking connection or its over-utilization. The present approach to solve that problem is to assign that job to another worker client (failover system) and to restart that job on that new worker client from the beginning. An essential disadvantage is that the job computation already done by the failed worker client is lost at least until the checkpoint if checkpointing is implemented.

The term checkpointing as used in the present patent application means a designated point in a program where processing is interrupted and all status information is recorded in order to restart the process at that point, thus avoiding necessity to repeat the processing from the beginning.

Furthermore, that approach requires to detect the failure of the worker client by either a so called heartbeat (very resource intensive and difficult to implement in a distributed computing infrastructure), or by a timeout set to the estimated completion time plus an additional safety margin. However that implies that the distributed computing management server restarts the computation at a point in time when the computation should have been completed. The result is a large delay in finishing computation.

If checkpointing is implemented, there are two possible layers where it could be implemented.

Checkpointing on the worker client protects against application software failures. The worker client can automatically restart the computation of the assigned workload.

Checkpointing on the central distributed management server protects against all failures in the distributed computing infrastructure. However it is very expensive in terms of resource consumption. Every worker client needs to stay in contact with the central distributed management server, e.g. requiring reliable network connections and lots of computing power on the management server.

SUMMARY OF THE INVENTION

The present invention provides a system and method for execution of a job in a distributed computing architecture that uses worker clients which are characterized by a checkpointing mechanism component for generating checkpointing information being assigned to at least one worker client, at least one failover system being assigned to the worker client, a component (failover system selection component) for automatically assigning at least one existing or newly created failover system to the failure system being assigned to a worker client in the case said worker clients fails, wherein the assigned failover system provides all function components in order to take over the execution of the job when said assigned worker client fails, wherein the assigned failover system further includes at least a failover monitor component for detecting failover situations of said assigned worker client.

Starting from this, the object of the present invention is to provide an improved method and system for execution a job in a distributed computing architecture avoiding the disadvantages of the prior art approaches.

The recitation herein of a list of desirable objects which are met by various embodiments of the present invention is not meant to imply or suggest that any or all of these objects are present as essential features, either individually or collectively, in the most general embodiment of the present invention or in any of its more specific embodiments.

DESCRIPTION OF THE DRAWINGS

The subject matter which is regarded as the invention is particularly pointed out and distinctly claimed in the concluding portion of the specification. The invention, however, both as to organization and method of practice, together with further objects and advantages thereof, may best be understood by reference to the following description taken in connection with the accompanying drawings in which:

FIG. 2E-1/ FIG. 2D-1 shows the process flow within the inventive failover system, particularly as this flow proceeds forth from FIGS. 2E and 2D.

DETAILED DESCRIPTION OF THE INVENTION

Figure 1:
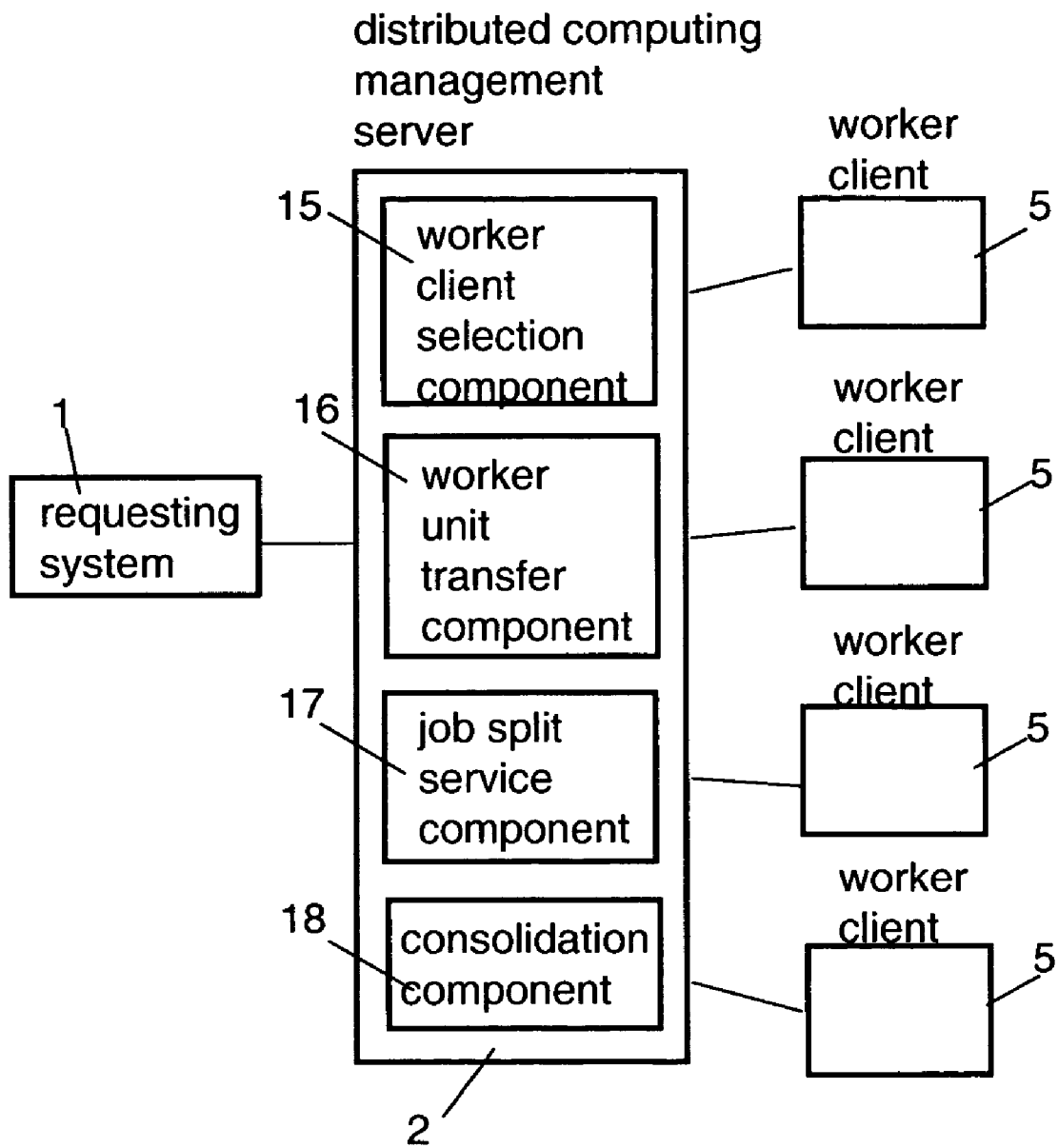
FIG. 1 shows a prior art distributed computing architecture.
Figure 2A:
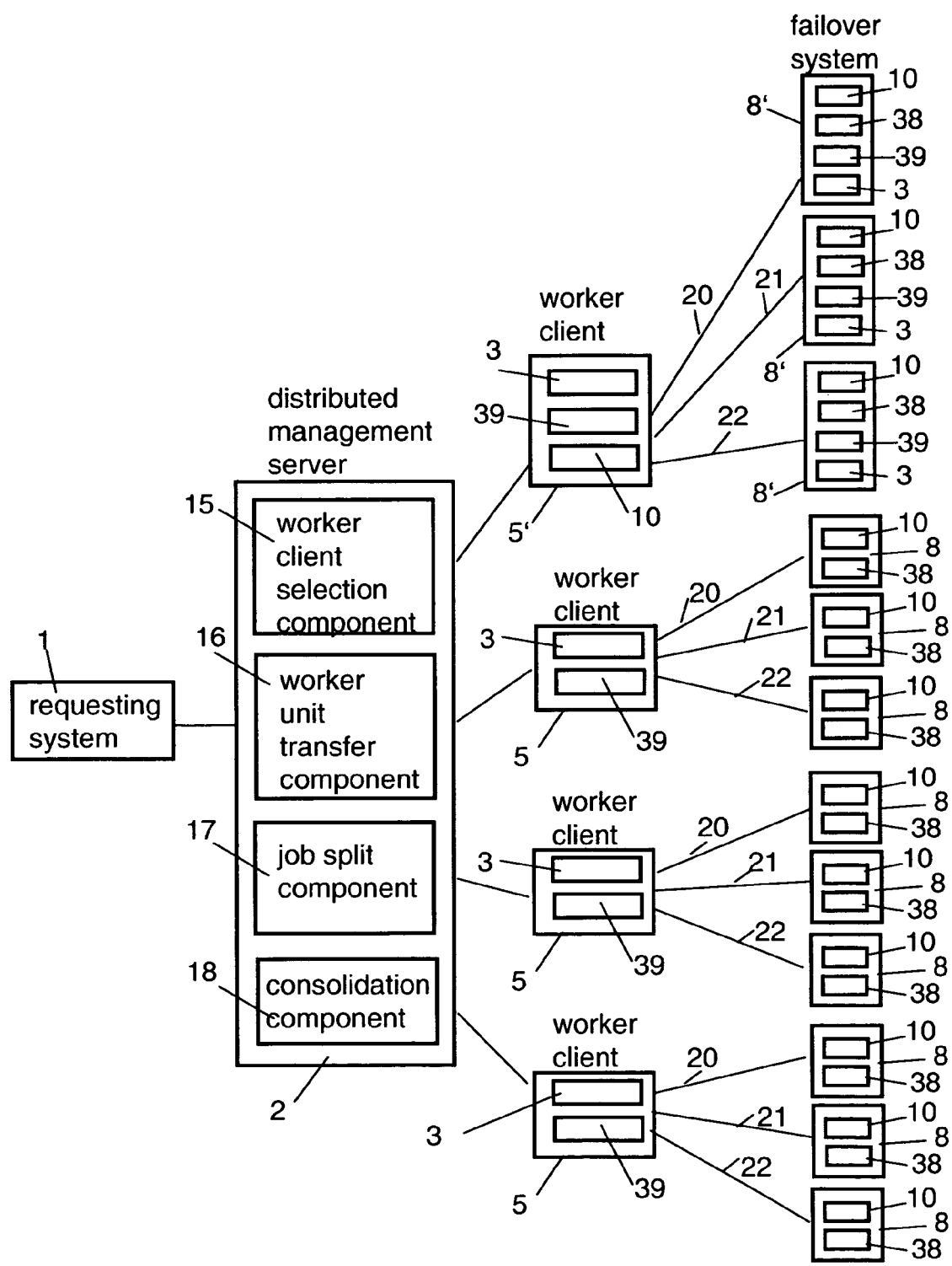
FIG. 2A shows the basic implementation of the present invention in a distributed computing architecture according to FIG. 1.

With respect to FIG. 2A, there is depicted a basic implementation of the present invention in a distributed computing architecture according to FIG. 1 that comprises n—worker clients 5 and at least one distributed management server 2. Each inventive worker client 5 is at least assigned a checkpointing mechanism 3, n—failover systems 8, and a failover system selection component 39.

The checkpoint mechanism 3 provides checkpoint information to all its assigned failover systems 8.

The failover system 8 is a backup system that can at any time take over the execution of the worker client's job when the worker client 5 fails. A worker client 5 can have multiple failover systems 8. The failover systems 8 have access to monitor component 10 that monitors at least one worker client 5 and in case of a worker client failure one of the failover systems 8 takes over the job and continues the execution of that job. There is communication between the failover systems 8 with each other in order to ensure that only one failover system 8 takes over the job (see the Group/quorum component 38). It should be noted that as with the worker clients 5, failover systems 8 could also be virtual worker clients 5. A failover system 8 can act as a monitor for multiple jobs on multiple worker clients 5. A failover system 8' can also be a worker client 5 for multiple jobs in parallel. In that case, each failover system 8' additionally includes all function components to work as any other worker client, e.g. includes additionally a checkpointing mechanism 3 and a failover system selection component 39 as described below.

The connections 20-22 from the worker clients to the failover system may be any network connection using the HTTP or IP protocol. However, any other connection using any other prior art communication protocol may be used instead.

The failover system selection component 39 provides the functionality to select the failover systems and to assign them to the specific worker client. Specific implementation details of the failover system selection component are described in more detail in connection with FIG. 3C.

In one preferred embodiment of the present invention, each worker client 5' additionally provides all function components to work as a failover system that means so that it can be selected by another worker client 5 as failover system 8.

In that preferred embodiment, each worker client 5' is additionally assigned a monitor/heartbeat service component 10 that provides the mechanism for checking the status of the worker client 5 to be assigned and answering status requests from the worker clients, e.g. the status information working or not working.

The distributed manager server 2 comprises at least a worker client selection service component 15 which provides the mechanism to determine the worker client 5 to run a job, a Work unit transfer component 16 which provides the mechanism to send the application itself, job parameter and input files, and to receive job-results from the worker clients 5, a Job split service component 17 which provide the mechanism to split a processing tasks into smaller units of works (jobs), and a Consolidation/task assembly component 18 which provides the mechanism to create a consolidated result to and to provide it to the requester system 1, a Scheduler service component 19 which provides a mechanism to assign jobs to worker clients being part of distributed architecture and previously selected by the client worker selection service.

The inventive distributed computing architecture does not need any central instance. Splitting and consolidation of the workloads, dispatching, assignments of worker clients and selection of worker clients are no single points of failure and do not need central instances. It is only required that the worker clients are connected via some common network. The proposed high availability system can only fail if major areas of the network are out of service.

Every administrative or management action can be done in a distributed way. The management needed to distribute and re-assemble the workload, potentially with optimizations like load balancing, can be very easily be implemented in a distributed way. Therefore, the scalability of our invention is infinite, as we do not have any central instance limiting our scalability.

The invented system can repair itself and attain the given redundancy level (like 3 failover systems per worker client) autonomically.

Local optimizations and selections of worker clients/ failover systems can be done in various ways using prior-art technology.

Figure 2B:
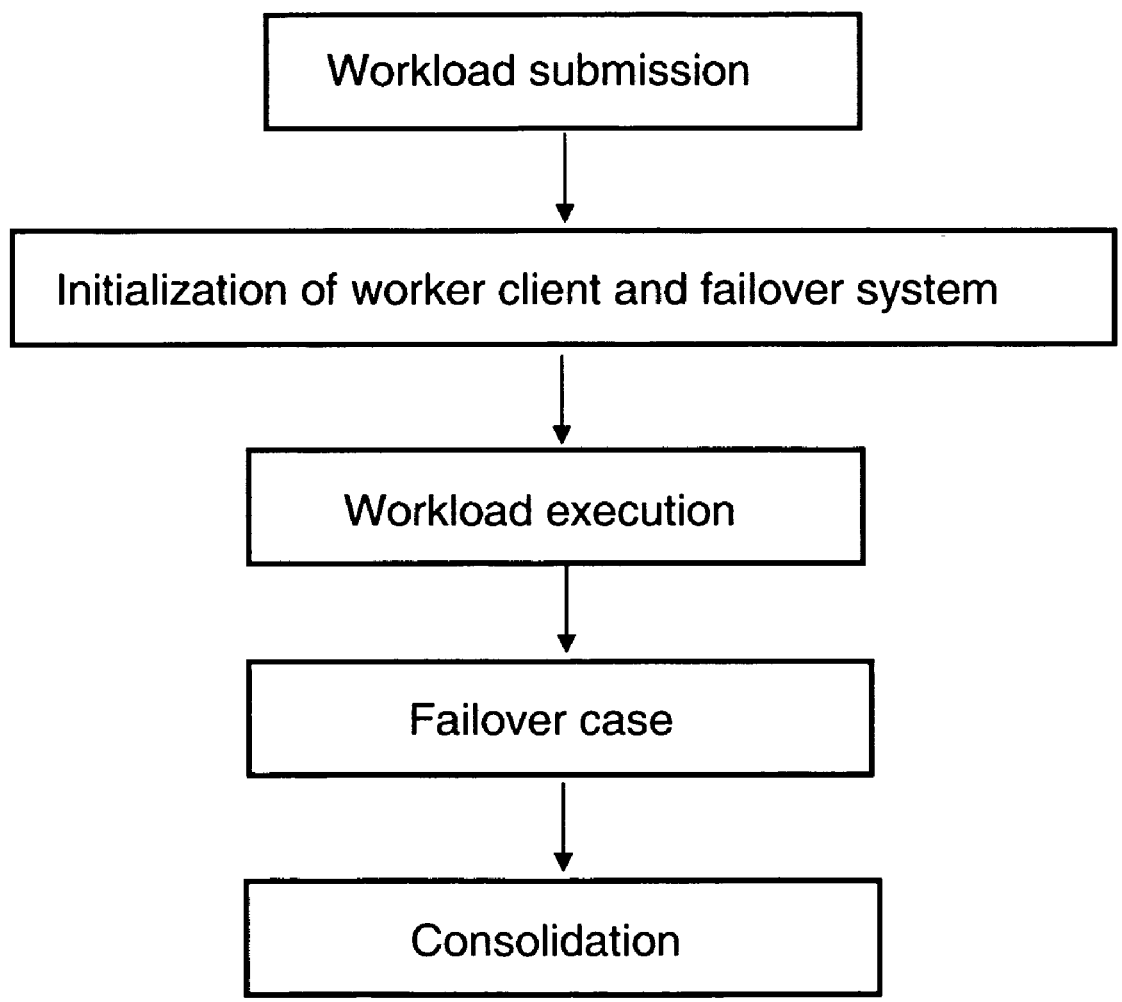
FIG. 2B shows a floating diagram with the method steps of the present invention in the architecture according to FIG. 2A.

With respect to FIG. 2B, there is depicted a floating diagram with the inventive method carried-out by the architecture according to FIG. 2A.

Figure 2C:
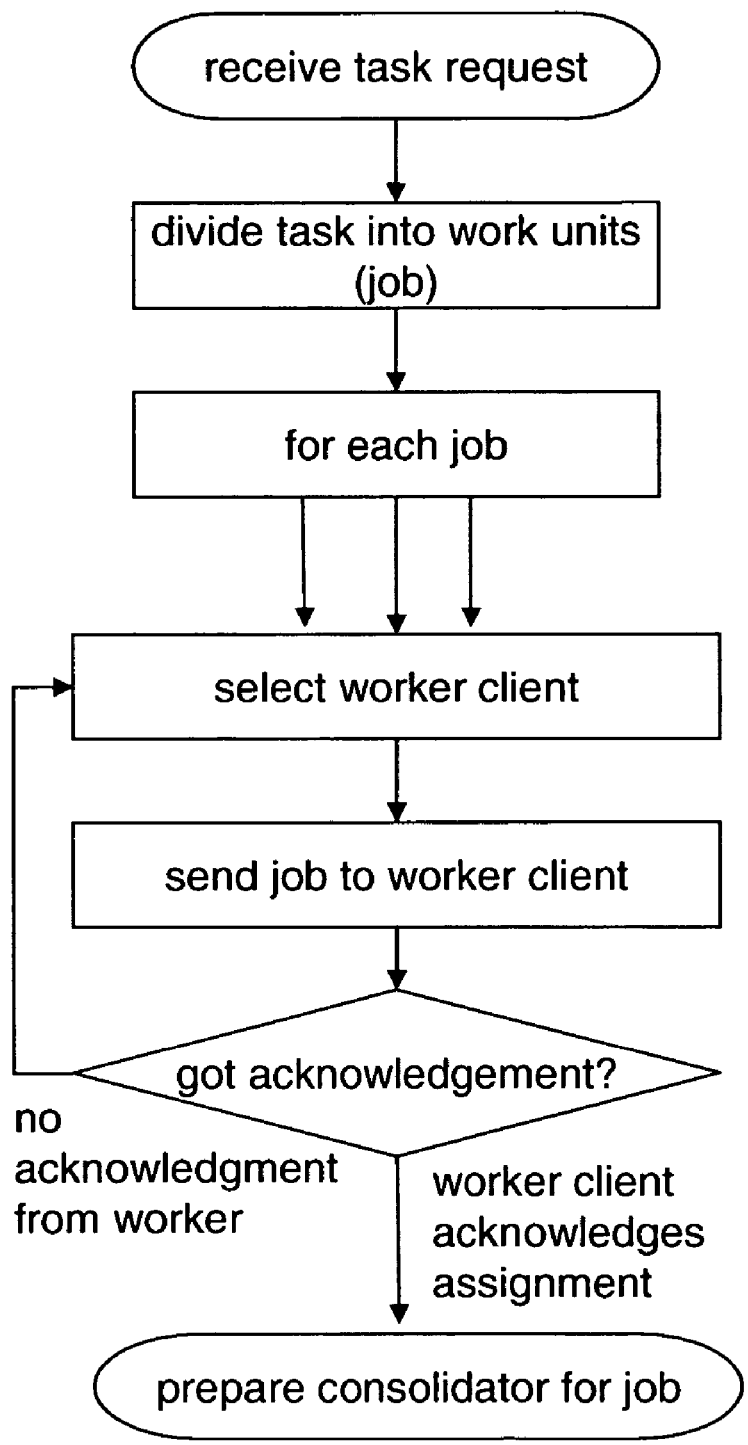
FIG. 2C shows the process flow within the inventive distributed management server.

Step 1: Workload Submission (see FIG. 2C)

The distributed management server gets a request to perform a task. It might be possible to divide this task into work units (jobs) which can be dispatched on several worker clients in the distributed architecture. The distributed management server selects a worker client for each job and sends the job to this worker client to execute it (workload submission). After that, the scheduler waits for an acknowledgement from each worker client. If the distributed management server does not receive the acknowledgement in a predefined time period, it starts again submitting the workload for the specific task and selects another worker client. After receiving the acknowledgement, the distributed management server instructs the Consolidator to prepare for collecting the results of all the worker clients.

Figure 2D:
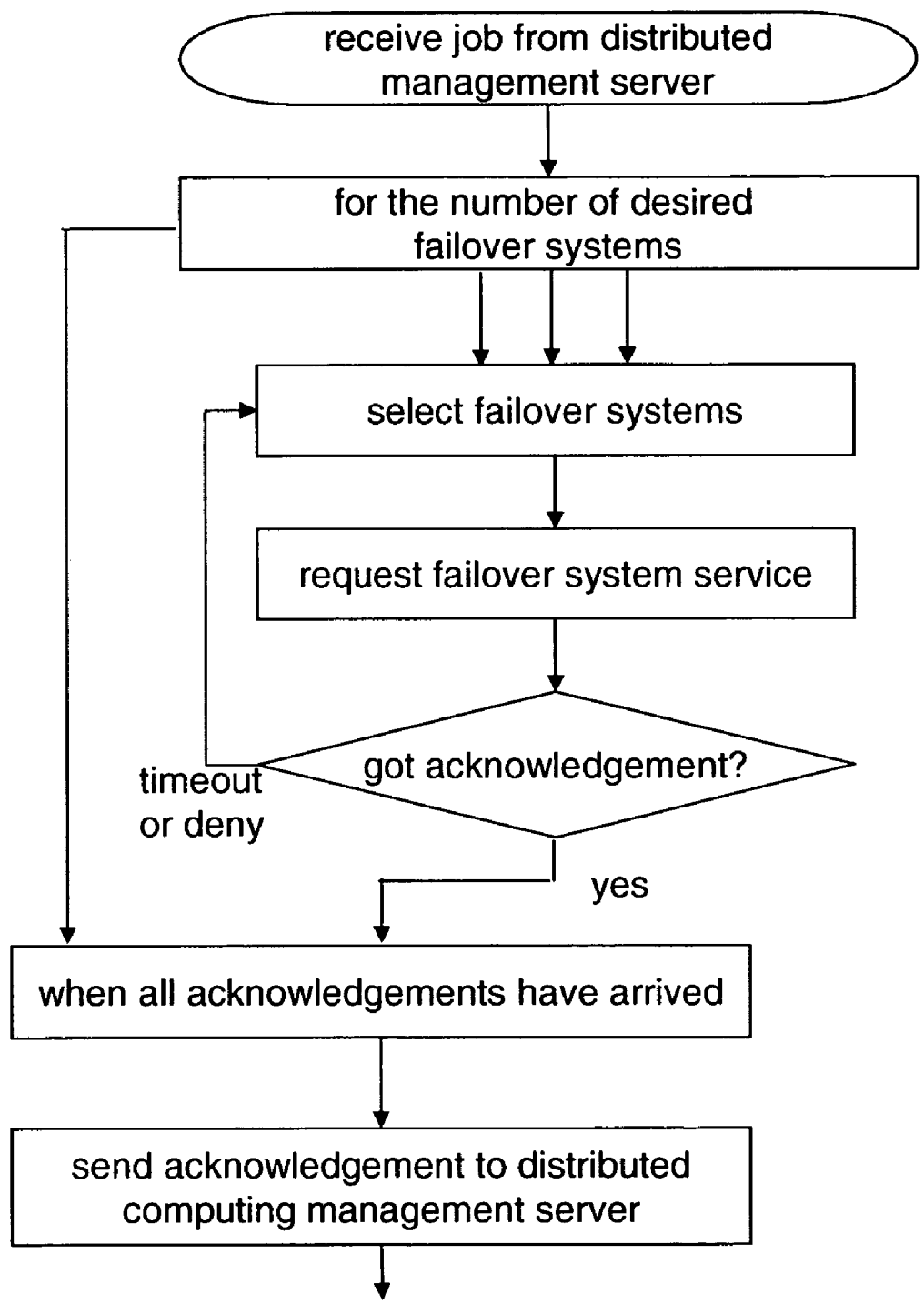
FIG. 2D shows the process flow within the inventive worker client.

Step 2: Initialization of Worker Client and Failover Systems (see FIG. 2D)

When a worker client receives a job from the distributed management server, its failover systems are determined. The worker client contacts its failover systems before it acknowledges the work. For example, a failover system could reject its selection as a failover system, because it is scheduled for service, or it has too much work to do, etc. As a next step the worker client's acknowledgement is sent to the distributed management server as described above in the workload submission step.

Step 3: Workload Execution

The worker client starts processing the job. Having completed the job, the worker client returns the result to the consolidator. When a result is acknowledged by the Consolidator, the failover systems are informed about the job completion and can be released of their roles.

Figure 2E:
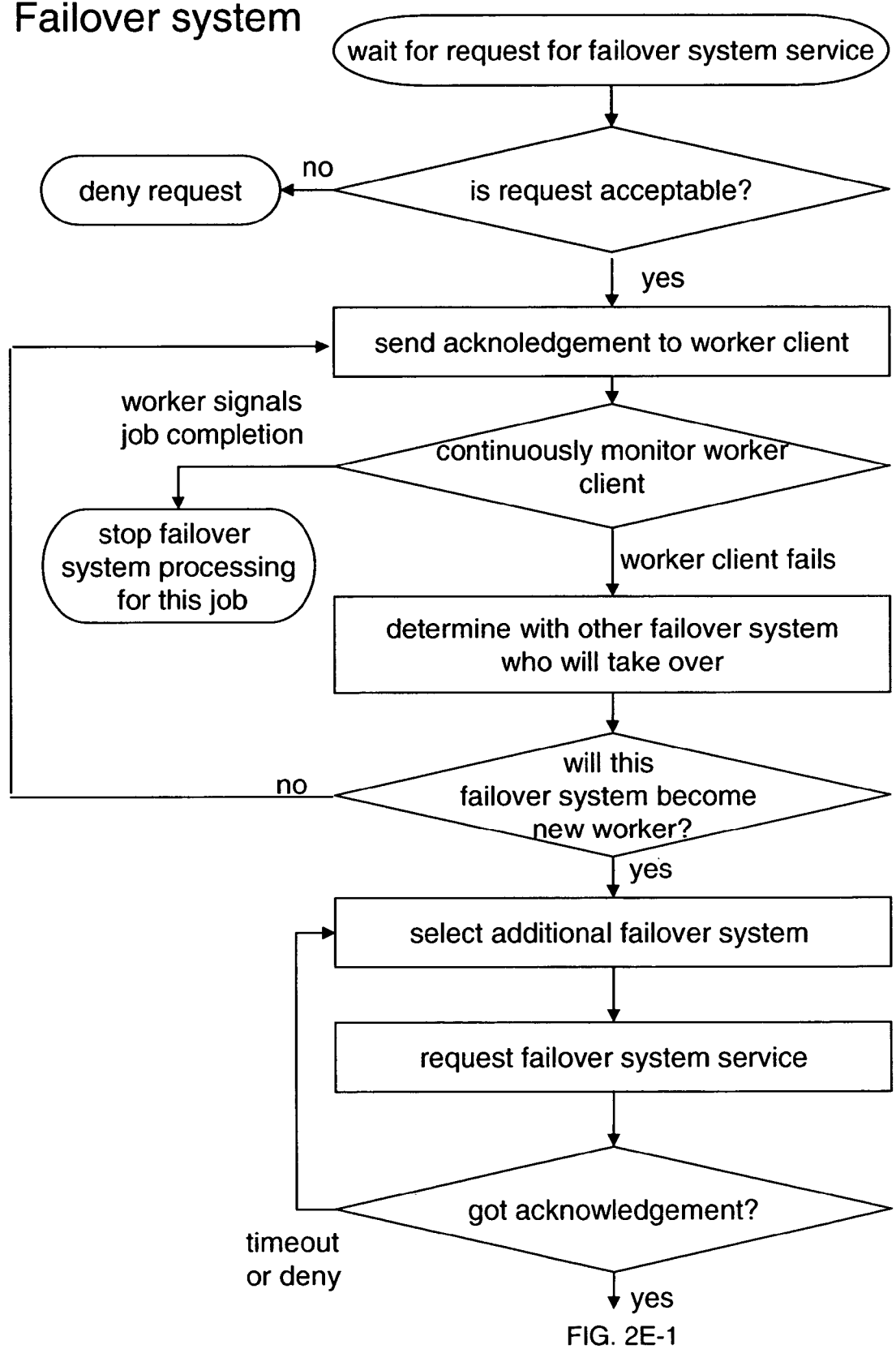
FIG. 2E shows the process flow within the inventive failover system.
Figures 1, 2D, 2E:
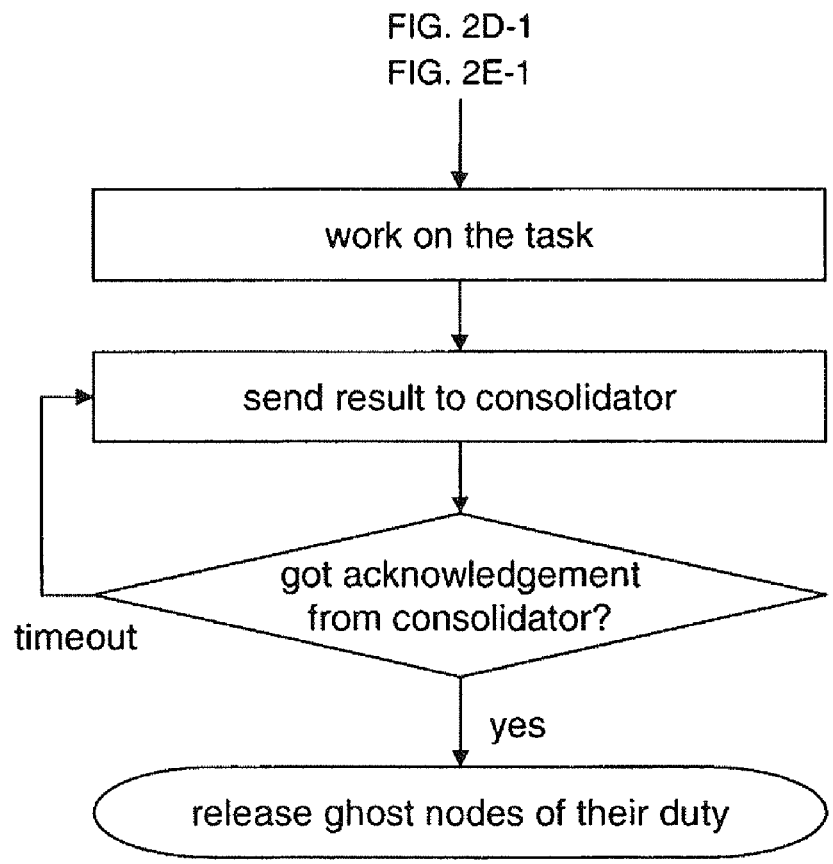

Step 4: Failover Case (see FIG. 2E)

As the failover systems monitor the worker client, they are able to detect worker client failures. In such cases, it has to be determined which failover system will take over the role of the worker client.

When a new worker client has been assigned, it first needs to determine additional failover systems (see also "Initialization step"). Then the worker clients execute the jobs.

Figure 2F:
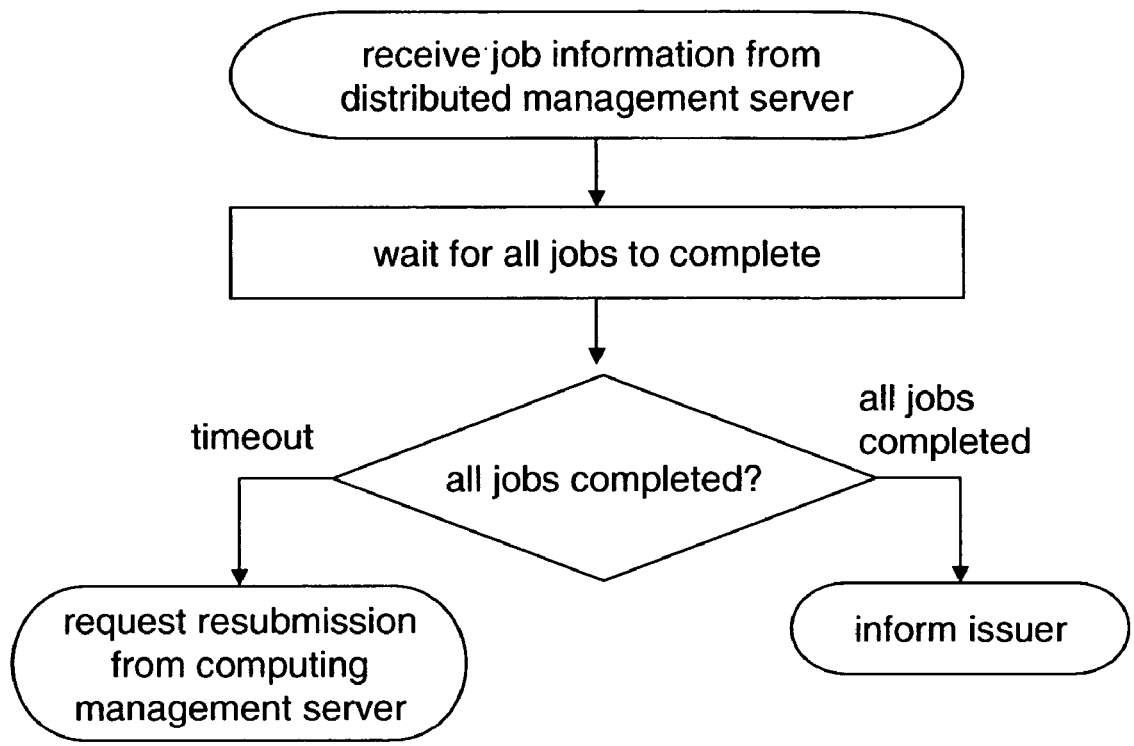
FIG. 2F shows the process flow within the inventive consolidator being preferably part of the distributed management server.

Step 5: Consolidation (see FIG. 2F)

Having completed the job, each worker client sends its result to the consolidator. The consolidator reassembles the set of results to the overall result of the originating task. The overall result is sent back to the request issuer.

There are several possibilities to handle the fact that results are outstanding for a longer period of time. If after a certain time one or more results are missing, the Consolidator can make the distributed management server or the Request Issuer resubmit the job. In case of a failover, notifications of the failover can be broadcasted to the interested parties so it is clear that the computation might take longer than originally expected.

Figure 2G:
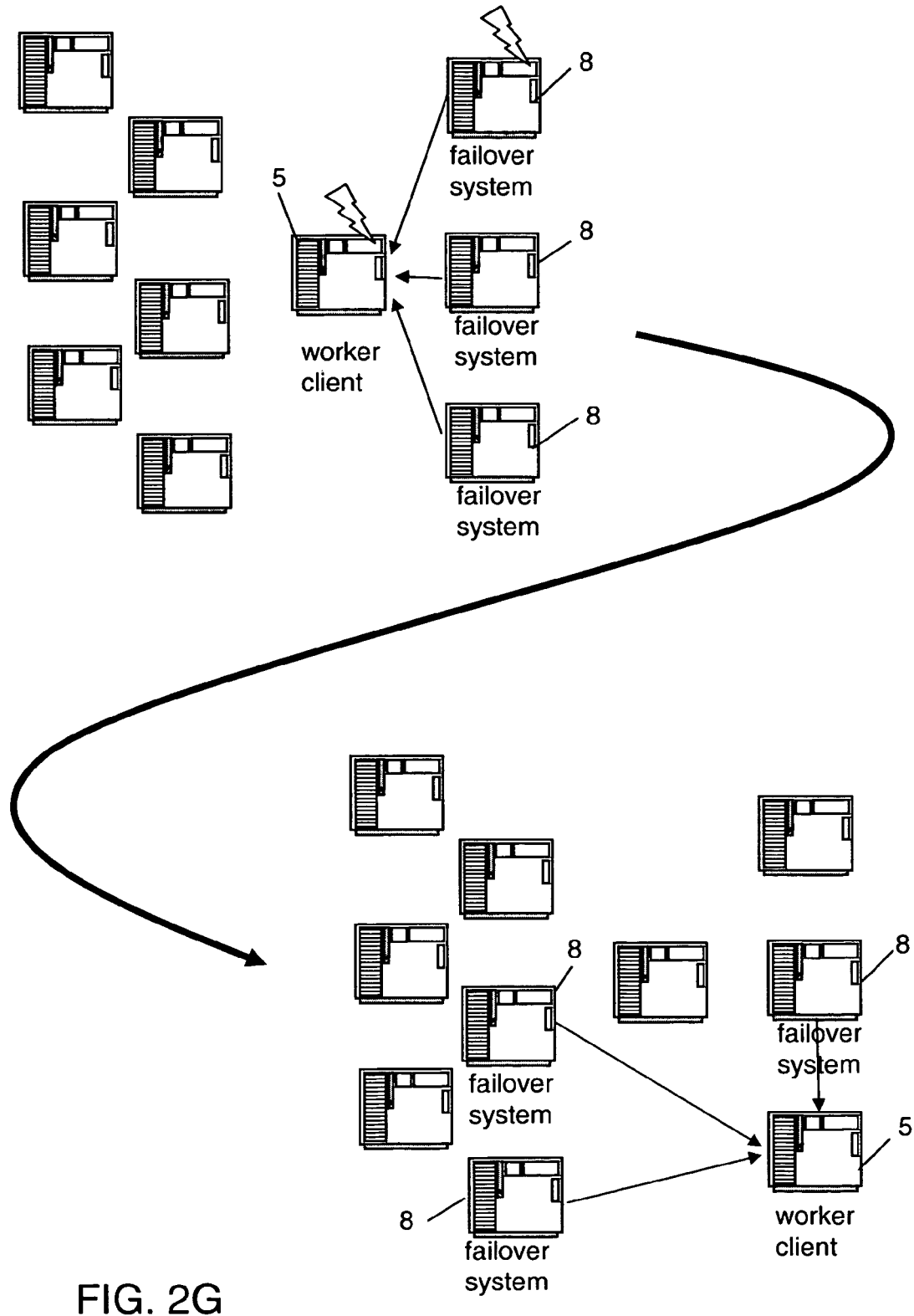
FIG. 2G shows the inventive failover scenario in a simplified distributed computing architecture.

With respect to FIG. 2G, there is depicted a failover scenario in a simplified distributed computing infrastructure.

The convention is that every worker client 5 should have exactly three failover systems 8 out of the pool of systems. The failover systems 8 can be worker clients on their own for different workloads.

In the beginning of the above example, two systems are defective: one failover system 8 and one worker client 5. The remaining two failover systems 8 can still communicate with each other, so they can start their election process. They do not know anything about the failed failover system 8 or about the former worker client 5, as those two systems failed and are not able to react on network requests any longer. The fact that the remaining failover systems 8 are not able to communicate with the failed systems may be caused by a network failure or by a failover system failure.

The remaining failover systems are now able to vote a new worker client, e.g. based on the node IP addresses or some other unique parameters. The new worker client has to create/assign two new failover systems in order to maintain the level of redundancy before the problem situation.

Figure 3A:
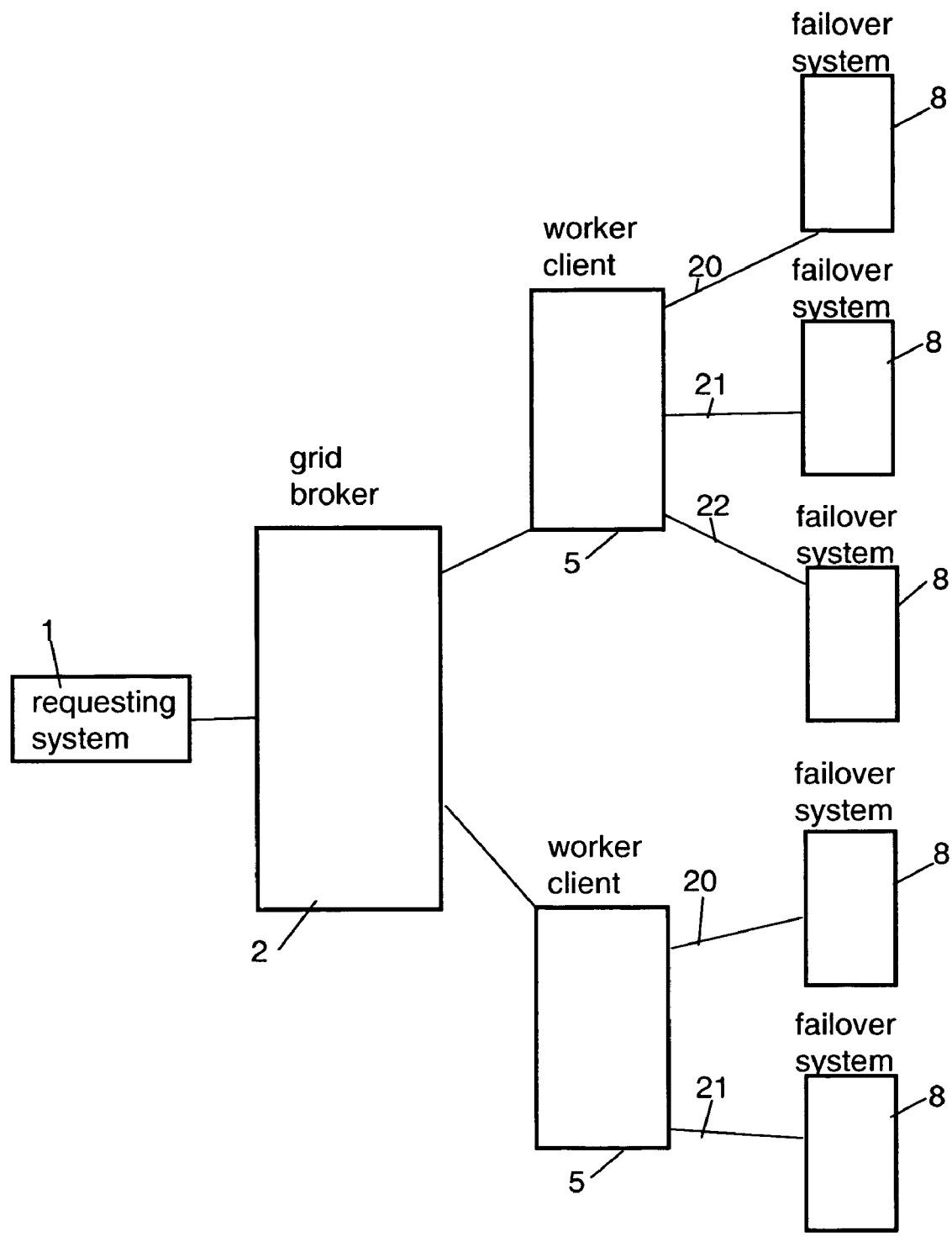
FIG. 3A shows a preferred implementation of the present invention in a Grid architecture.
Figure 3B:
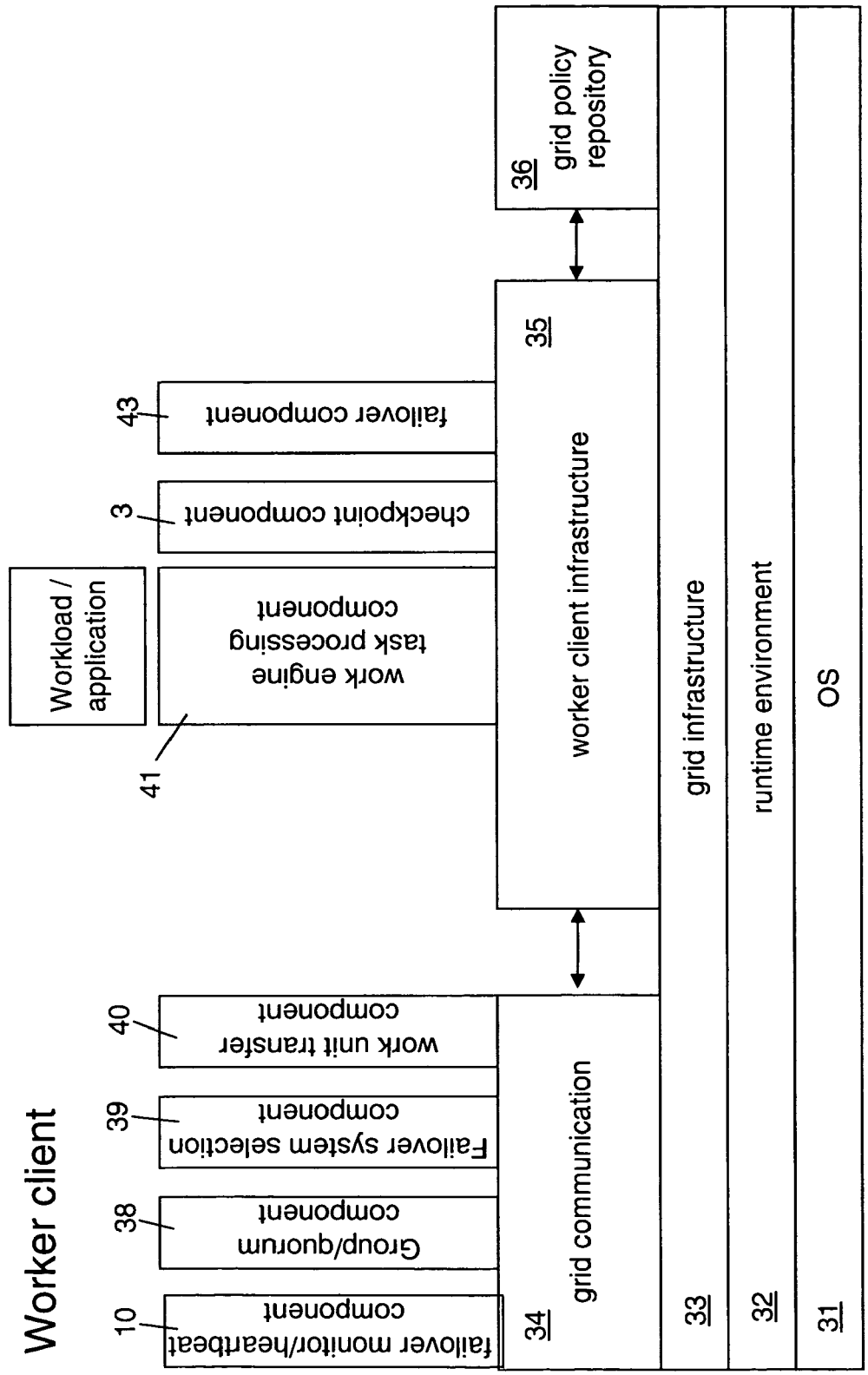
FIG. 3B shows a more detailed view of the structure of the worker client being part of the grid architecture according to FIG. 3A.
Figure 3C:
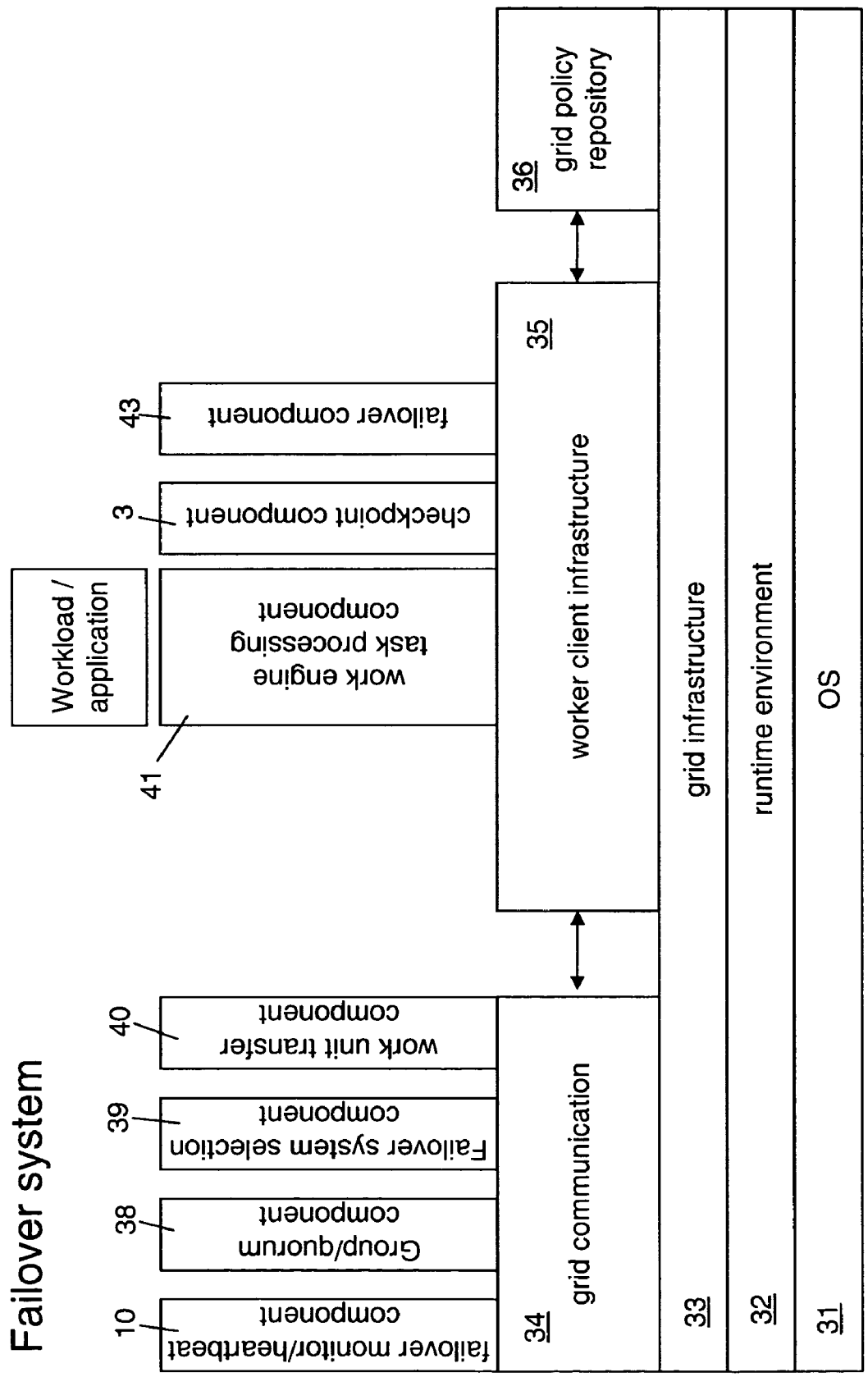
FIG. 3C shows a more detailed view of the structure of the failover systems being part of the grid architecture according to FIG. 3A.
Figure 3D:
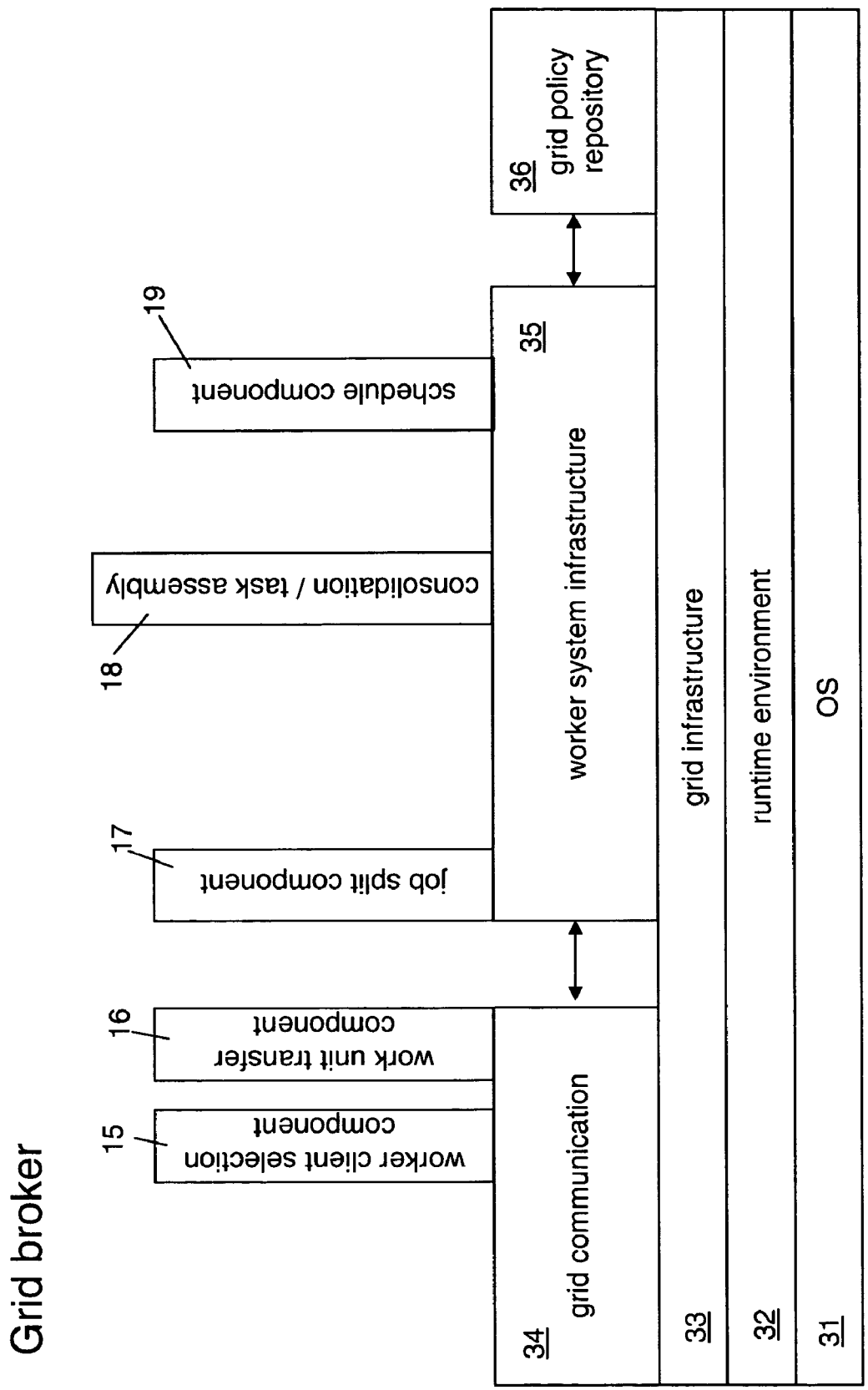
FIG. 3D shows a more detailed view of the structure of the Grid broker being part of the grid architecture according to FIG. 3A.

With respect to FIG. 3A, there is depicted a preferred implementation of the present invention in a Grid architecture which consist of a number of worker clients 5(see a more detailed view in FIG. 3B), a Grid broker 2 (see a more detailed view in FIG. 3C), and n—failover systems 8(see a more detailed view in FIG. 3D).

A job submitted to the Grid is usually workload that can be distributed in the Grid, like a large data set that an algorithm runs on, or a large transaction, but it also makes sense for smaller transactions or generic workloads for various reasons (data replication, installation effort, usage-based licensing conditions of software, etc.).

The request issuer provides a task to the Grid Broker 2 which can be split into work units or so called jobs. After the Grid has finished up the calculation of the job, the Request Issuer 1 receives the result. The request issuer 1 can be viewed as the "Grid customer."

The Grid Broker 2 has the role of a receptionist. Request issuers 1 get into contact with the Grid Broker 2 and ask to perform the following task. The Grid Broker 2 splits the task into jobs and gives them to the worker clients 5.

If the task does not need to be split into jobs, the Grid Broker 2 can be reduced to an instance selecting any worker client 5 of the grid with suitable characteristics (like locality and current load), e.g. using SLP standard internet protocol. Every worker client 5 in the grid could advertise its ability to work as a worker client 5 and/or failover system 8 using existing protocols, and the issuer 1 could choose any of those worker clients 5.

A worker client 5 is a system in the grid that receives a job from the Grid Broker 2 and calculates the result. A worker client 5 can accept multiple jobs from the Grid Broker 2 in parallel. A worker client 5 can also be a failover system 8 for another worker client 5.

A failover system 8 is a backup node which can at any time take over the execution of the worker client's job when the worker client 5 fails. A worker client 5 can have multiple failover systems 8. A failover system monitors the worker client 5 and in case of a worker client failure an elected one of the failover systems 8 will take over. There is communication between the failover systems 8 to ensure that only one failover system 8 takes up the job. As with the worker client 5, failover systems 8 could also be virtual worker clients 5. A failover system 8 can act as a monitor for multiple jobs on multiple worker clients 5. A failover system 8 can also be a worker client 5 for multiple jobs in parallel.

The role of the consolidator is to receive all results and return the overall result to the request issuer 1. Depending on the executed workload, the consolidator might be very simple; in the simplest case it can be reduced to the data transfer of the result to the request issuer 1.

It is possible that the Grid Broker 2 and the Consolidator are implemented on the same system as shown in FIG. 3A.

With respect to FIG. 3B, there is depicted a more detailed view of the structure of the worker client 5 being part of the inventive grid architecture according to FIG. 3A.

In general a worker client 5 is a system in the grid that receives a job from the Grid Broker 2 and calculates the result.

It should be noted that a worker client 5 can accept multiple jobs from the Grid Broker in parallel. A worker client 5 can also be a failover system 8 for other worker clients 5.

Each worker client 5 which is part of a grid architecture can be used as a failover system 8 for one or more worker clients 5. Each worker client 5 preferably includes a worker client's operating system 31, a run time environment 32, a Grid infrastructure 33, a Grid communication component 34, a worker client infrastructure 35, Grid policy repository 36, a Monitor/heartbeat service component 10, a Group/quorum service component 11, a Failover system selection services component 12, a Work unit transfer service component 40, a Work engine task processing services component 41, a Checkpoint services component 42, and a Failover service component 43.

The worker client's operating system 31 may be for example Windows, AIX, etc.

The Run time environment 32 comprises for example libraries, a Java virtual machine, etc.

The Grid infrastructure 33 provides mechanisms for creating, managing, and exchanging information amongst participants (e.g. other worker clients 5, grid broker 2).

The Grid communication component 34 provides the mechanism for communicating with other participants (e.g. worker clients 5, grid broker 2) that could be implemented using a protocol based on TCP/IP.

The Worker client infrastructure 35 comprises the environment to execute the assigned job, e.g. application libraries, the application code itself, application server, persistent storage for storing checkpointing information.

The Grid policy repository 36 which is a data base contains rules for operating the grid, e.g. authentication and registration of worker clients 5, job configurations (e.g. amount of memory for a specific job, amount of CPU for a specific job).

The Monitor/heartbeat component 10 provides the mechanism for checking the status of other worker clients 5 and answering status requests from other worker clients being part of the grid, e.g. the status information working or not working. The detection of a worker client failure can be implemented with today's HA techniques, like heartbeats of the worker node or the failover systems, or it can be performed by means of a monitoring infrastructure.

The Group/quorum component 38 provides the mechanism to identify the failover system 8 which becomes the new client worker, e.g. determining the failover system 8 amongst a group of assigned failover systems 8. In a preferred implementation of the group/quorum component 38 if the current worker client 5 fails, the remaining failover systems 8 have to elect a new worker client 5 using some existing algorithm. Possible algorithms include the election based on the lowest IP address of the worker client. If it is not possible to communicate between all remaining failover systems 8, one has to make sure that only one new worker client is created for some applications, as two instances of worker client might be harmful. In this case, conventions like the following could be used: a failover system can only become a new worker client if and only if the worker client fails, it knows the majority of the remaining failover systems, and it has some special characteristic like the lowest IP address.

Just after a new worker client has been elected, this worker client has to inform the remaining worker clients that it has taken over the responsibility of a worker client. Additionally, this worker client has to initiate the creation of a new failover system in order to replace itself; otherwise, the level of redundancy in the grid would degrade. The number of failover systems per worker client is subject of desired reliability and can be tuned. The invention can be implemented in a way the grid tries to maintain a given number of failover systems per worker nodes for availability reasons. The selection of the failover systems can be performed either by the worker client itself or by the Grid Broker when it assigns a task to the worker client. In the latter case, the Grid Broker will select candidates for failover systems and propose these failover systems to the worker clients which can or can not follow this advice.

This procedure is also to be used when new failover systems are to be created in failure situations.

The Failover system selection component 39 provides the mechanism to identify the n—failover systems 8 for its worker client 5. A possible implementation of the failover selection component 39 is that candidate failover system 8 will be asked if it can perform this task or not. Another implementation could be that any worker client 5 which is able to compute the task is kept in a centralized directory. After a request the directory service returns a set of nodes. The implementation of the directory service itself can of course be based on several alternative algorithms. A further implementation could be that the selection of worker clients 5 can be based on locality. Locality could for example mean that nodes with the closest network distance are chosen.

A further implementation could be that worker clients 5 are selected due to the fact that these have access to the same memory space as the worker client 5. An example here is the NUMA architecture. A further implementation could be that only worker clients 5 can be selected that have access to the same storage as the worker client 5. A reason for this could be that worker clients 5 have access in a failover situation to the data space the worker client 5 previously used. A further implementation could be workload based (according to workload usage of Work clients).

Failover systems 8 can be selected based on the workload information about the worker clients 5 in the grid. For example only those worker clients 5 which have the lowest workload are chosen. A further implementation could be QoS Quality of Services. QoS Quality of Services can be a base for the worker client. Here one possibility is that only nodes with the highest quality of services (availability, performance) are chosen as worker client. A further implementation could be that the worker clients are selected due to the fact that these are not located on the same site were the worker node runs, or based on priority of the workload to be executed.

The Work unit transfer component 40 provides the mechanism to receive the application itself, job parameter and input files, and to send job-results to the grid broker.

The Work engine task processing component 41 provides the mechanism to information the grid broker 2 about the acceptance of the job and executes it.

The Checkpoint component 42 provides the mechanism to provide checkpoint information to all assigned failover systems 8. The probably most generic and easiest way of doing checkpointing is checkpointing whole processes which are running on the worker clients. Using Beowulf APIs, this would be possible using the bproc_vmadump( ) and bproc_vmaundump( ) API functions. If the worker clients are running in a virtual server environment, an alternative approach would be to hibernate the whole operating system of the worker node and restore it later.

If a worker client 5 fails, one needs to take special care of open TCP/IP socket connections. One solution approach here is the z/OS Virtual IP Addressing capability (VIPA) shipped as part of the IBM z/OS operating system.

The Failover component 43 provides the mechanism to restart the job on one of the assigned failover systems 8. The simplest scenario of a failover system 8 taking over a worker client's job is by starting the job from the scratch. More sophisticated implementations like checkpointing, transactions, or others can improve the failover efficiency. The failover systems 8 can monitor each other. Even on the worker client 5, a failover system 8 of its own job can monitor the other failover systems 8 to enhance the availability.

With respect to FIG. 3D, there is depicted a more detailed view of the structure of the Grid Broker 2 being part of the grid architecture according to FIG. 3A.

The Grid Broker 2 has the role of a receptionist. Request Issuer 1 gets into contact with the Grid Broker 2 and asks to perform the following task. The Grid Broker splits the task into jobs and gives them to the worker clients 5. If the task does not need to be split into jobs, the grid broker 2 can be reduced to an instance selecting any node of the grid with suitable characteristics (like locality and current load), e.g. using SLP standard internet protocol. Every worker client 5 in the grid could advertise its ability to work as a worker client 5 and/or failover system using existing protocols, and the issuer could choose any of those nodes.

The Grid broker 2 preferably comprises a worker client selection component 15, a work unit transfer component 16, a job split component 17, a Consolidation/task assembly component 18, and a scheduler component 19.

The worker client selection service component 15 provides the mechanism to determine the worker client to run a job.

The work unit transfer component 17 provides the mechanism to send the application itself, job parameter and input files, and to receive job-results from the worker clients 5.

The job split component 18 provides the mechanism to split a processing task into smaller units of work (jobs). A large job can be divided into several parts by divide-and-conquer means. Any parallelizable part of the job can be dispatched by the Grid Broker 2 onto several worker clients 2. This splitting is workload dependent and can comprise splitting by independent or mostly independent data ranges or splitting by dissecting a transaction into parallel tasks using common methods of transactional systems. A different way of distributing workload is not to split it but to distribute identical tasks to several worker nodes. This can be used to increase reliability and if execution speed matters more than resource utilization—even if some tasks are delayed due to failures and fallbacks to the last checkpoint on ghost nodes, another worker node may run through without problems.

The Consolidation/task assembly component 18 provides the mechanism to create a consolidated result to provide it to the requester system. The Grid Broker 2 has to assign a Consolidator for each job. This can be done using any of the above algorithms of selecting a failover system 8. The Consolidator 18 can be made highly available using today's methodology of HA, or it can deploy its own failover systems.

The Scheduler component 19 provides a mechanism to assign jobs to worker clients 5 being part of grid and previously selected by the worker client selection component. Moreover, the worker client selection can be implemented based on any of the above described method for of selecting a failover systems 8.

With respect to FIG. 3D, there is depicted a more detailed view of the structure of the Failover system being part of the grid architecture according to FIG. 3A.

The failover systems 8 preferably use the same components as the client worker because they are potential worker clients 5 (see FIG. 3B).

A failover system 8 is a backup system which can at any time take over the execution of the worker client's job when the worker client 5 fails. A worker client 5 can have multiple failover systems 8. The failover systems 8 monitor the worker client 5 and in case of a worker client failure an elected one of the failover systems will take over. There is communication between the failover systems 8 to ensure that only one (or a specified number of) failover system 8 takes up the task. It should be noted that as with the worker clients 5, failover systems 8 could also be virtual worker clients 5. A failover system 8 can act as a monitor for multiple tasks on multiple worker clients 5. A failover system can also be a worker client for multiple tasks in parallel.

While the invention has been described in detail herein in accord with certain preferred embodiments thereof, many modifications and changes therein may be effected by those skilled in the art. Accordingly, it is intended by the appended claims to cover all such modifications and changes as fall within the true spirit and scope of the invention.

The invention claimed is:

1. A data processing system implemented using a worker client in a distributed computing architecture having a designated computer for splitting processing tasks into smaller jobs, a computer network for transmitting each of said jobs to one of a plurality of worker clients in order to execute said assigned jobs, each of said worker clients having:
   a checkpointing component for generating checkpointing information, said checkpointing component being assigned to at least one of said worker clients;
   at least one failover system assigned to said at least one worker client;
   a failover system selection component for automatically assigning at least one existing or newly created failover system to at least one said worker client in the case that said worker clients fails;
   wherein said assigned failover system includes all function components of at least one worker client in order to take over the execution of one of said jobs, when said at least one worker client fails, using said checkpointing information; and
   wherein said assigned failover system further includes at least a failover monitor component for detecting failover situations of said at least one worker client.

2. The data processing system of claim 1 in which said worker client, is assigned the same function components as a failover system in order to be selectable as a failover system for at least one other worker client or failover system.

3. The data processing system of claim 2 in which said worker client is further assigned a failover monitor component for detecting failover situations of said at least one worker client.

4. The data processing system of claim 1 wherein to each worker client there is assigned multiple failover systems.

5. The data processing system of claim 4 wherein said multiple failover systems include a group quorum component, to determine amongst one another, one of said multiple failover systems as a new worker client.

6. The data processing system of claim 4 wherein said failover system selection component determines the failover systems for said at least one worker client by a defined communication protocol with candidate failover systems, or by access to a service which provides a list with all candidate failover systems.

7. The data processing system of claim 1 wherein said distributed computing architecture is a grid infrastructure.

8. A data processing method for implementing a failover system in a distributed computing architecture having a designated computer for splitting processing tasks into smaller jobs, a computer network for transmitting each of said jobs to one of a plurality of worker clients in order to execute said jobs, said method comprising the step of:

assigning said failover system to at least a specific worker client having an assigned checkpointing mechanism component for generating checkpointing information for at least said worker client; and assigning, by a failover system selection component within the client, at least one existing or newly created failover system to said worker client in the case said worker clients fails, wherein said failover system further includes all function components of at least one said worker client in order to take over the execution of the job, when said worker client fails, using said checkpointing information, and;

detecting failover situations of said worker client by a failover monitor component.

9. The failover method of claim 8, in which said failover system has the same function components as said worker client in order to be additionally selectable as a worker client.

10. The failover method of claim 9, in which said failover system has an assigned checkpointing component for generating checkpointing information of at least one worker client and a failover system selection component for automatically assigning at least one existing or newly created failover system to said failure system in the case that said worker client fails.

11. The failover method of claim 9, wherein the failover system further includes a component to determine at least one failover system amongst failover systems assigned to the same worker client in the case of failure a new worker client.

12. The failover method of claim 8 in which said distributed computing architecture comprises a grid infrastructure.

13. A distributed computing architecture having a distributed management server for receiving process tasks, splitting them into smaller jobs, and selecting worker clients for execution of said jobs, said infrastructure comprising:

a plurality of worker clients;

a computer network for transmitting each of said jobs to one of a plurality of worker clients in order to execute said jobs;

wherein at least one of said worker clients is associated with:

a checkpointing component for generating checkpointing information, wherein said checkpointing component is assigned to at least one of said worker clients;

at least one failover system assigned to said worker client, wherein said assigned failover system includes all function components in order to take over execution of said job when said worker client fails, using said checkpointing information;

a failover system selection component within the worker client for automatically assigning at least one existing or newly created failover system to said failure system in the case that said worker client is not assigned thereto; and wherein said assigned failover system further includes at least a failover monitor component for detecting failover situations of said worker client.

14. A method for executing work jobs in a distributed computing infrastructure having a distributed management server and worker clients, wherein said distributed management server gets requests to perform a task, divides the task into smaller jobs, selects worker clients for each job and sends said jobs to said selected worker clients, wherein the method at each of said worker clients comprises the steps of:

determining at least one assigned failover system assigned by the worker client, for said worker client executing a job;

providing checkpointing information generated by said worker client to said failover system; and monitoring said worker client in order to detect a failover, wherein said failover system takes over and continues execution of said job and automatically assigns an existing or a newly created failover system to said failover system in the case said worker client fails.

15. A computer program product stored in internal memory of a digital computer, containing parts of software code to execute the method in accordance with claim 14 if the product is run on the computer.

16. A method for executing jobs in a distributed computing infrastructure having a distributed management server, worker clients, and systems selectable as failover systems, wherein said distributed management server gets requests to perform a task, divides the task into smaller jobs, selects worker clients for each job and sends said jobs to said selected worker clients, said method at said systems being selectable as failover systems, said method comprising the steps of:

selecting a failover system by at least one worker client;

receiving checkpointing information from said at least one worker client;

monitoring said worker client in order to detect a failure;

taking over and continuing execution of said job by said failover system using said checkpointing information in case of a failure being detected; and assigning at least one existing or a newly created failover system to the failover system which is continuing execution of said job.

17. A computer program product stored in internal memory of a digital computer, containing parts of software code to execute the method in accordance with claim 15 if the product is run on the computer.

* * * * *